(12) United States Patent
Sharma

(10) Patent No.: US 9,902,357 B2
(45) Date of Patent: Feb. 27, 2018

(54) VEHICLE ACCIDENT DAMAGE CONTROL SYSTEM

(71) Applicant: Madan Mohan Sharma, Bulandshahr (IN)

(72) Inventor: Madan Mohan Sharma, Bulandshahr (IN)

( * ) Notice: Subject to any disclaimer, the term of this patent is extended or adjusted under 35 U.S.C. 154(b) by 0 days.

(21) Appl. No.: 15/102,782

(22) PCT Filed: Dec. 8, 2014

(86) PCT No.: PCT/IN2014/000753
§ 371 (c)(1),
(2) Date: Jun. 8, 2016

(87) PCT Pub. No.: WO2015/087342
PCT Pub. Date: Jun. 18, 2015

(65) Prior Publication Data
US 2016/0311389 A1     Oct. 27, 2016

(30) Foreign Application Priority Data

Dec. 9, 2013    (IN) .......................... 3011/DEL/2013

(51) Int. Cl.
*B60R 21/02*    (2006.01)
*B60R 19/26*    (2006.01)
(Continued)

(52) U.S. Cl.
CPC .............. *B60R 21/02* (2013.01); *B60K 28/14* (2013.01); *B60R 19/26* (2013.01); *B60R 19/32* (2013.01); *B60R 19/40* (2013.01); *B60R 19/48* (2013.01); *B60W 10/02* (2013.01); *B60W 10/18* (2013.01); *B60W 30/08* (2013.01); *B60R 2019/262* (2013.01); *B60W 2530/00* (2013.01);
(Continued)

(58) Field of Classification Search
CPC ......... B60R 21/02; B60R 19/32; B60R 19/26; B60R 19/48; B60R 19/40; B60R 2019/262; B60K 28/14; B60W 30/08; B60W 10/18; B60W 10/02; B60W 2710/021; B60W 2710/18; B60W 2530/00; B60Y 2400/406
See application file for complete search history.

(56) References Cited

U.S. PATENT DOCUMENTS 4,284,177 A * 8/1981 Domek .................. B61F 5/127
188/280
5,566,794 A * 10/1996 Wiard .................... F16F 9/486
188/287

(Continued)

*Primary Examiner* — Drew J Brown

(57) ABSTRACT

According to this Invention When "Vehicle Accident Damage Control System" attach vehicle collides with another vehicle or some obstruction, then because of change in velocity, there is Impact force generated in between leg guard/safety plate (1) and vehicle or obstruction. This leg guard work according to the "Lever principle". This Impact force is used to push the piston of APCPDSA. The result of collision reduces by the increases damping force, which generated by hydraulic fluid flow out from internal cylinders (4.1) & (4.2) through (a-b-c) combinations in APCPDSA. At the same time hydraulic fluid flow with the help of FBS pushes the break of vehicle intermittently and with the help of CCS, the clutch has been regularly pushed and ejects the relation of gear with engine.

9 Claims, 5 Drawing Sheets

Figure 1:
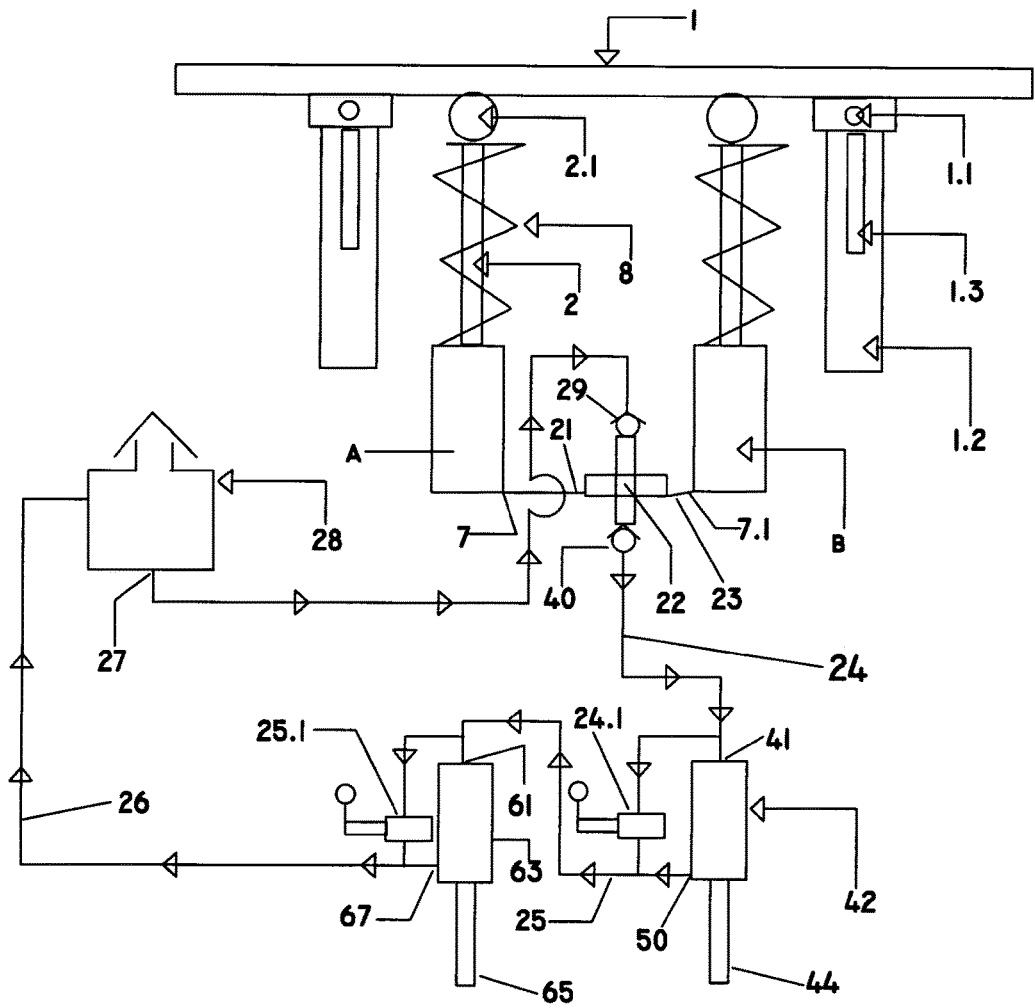

(51) Int. Cl.
*B60R 19/40* (2006.01)
*B60R 19/48* (2006.01)
*B60K 28/14* (2006.01)
*B60R 19/32* (2006.01)
*B60W 10/02* (2006.01)
*B60W 10/18* (2012.01)
*B60W 30/08* (2012.01)

(52) U.S. Cl.
CPC ... *B60W 2710/021* (2013.01); *B60W 2710/18* (2013.01); *B60Y 2400/406* (2013.01)

(56) References Cited

U.S. PATENT DOCUMENTS

| | | | |
|---|---|---|---|
| 7,819,218 B2 * | 10/2010 | Eichberger | B60R 19/00 180/274 |
| 8,155,851 B2 * | 4/2012 | Kuzel | B60T 8/4872 280/425.1 |
| 8,468,652 B2 * | 6/2013 | Salice | F16F 9/19 16/286 |

* cited by examiner

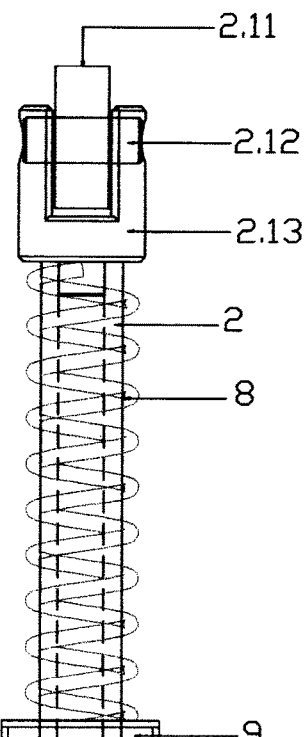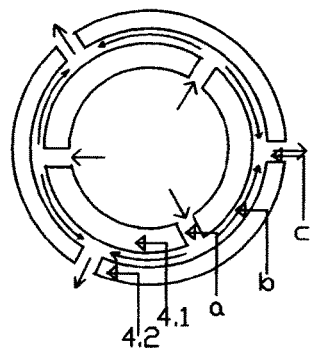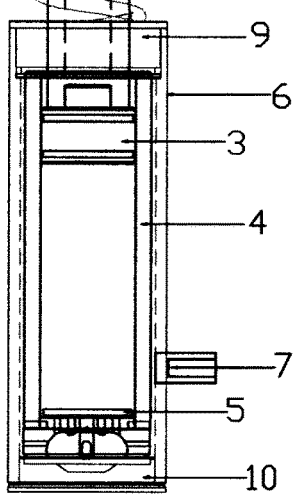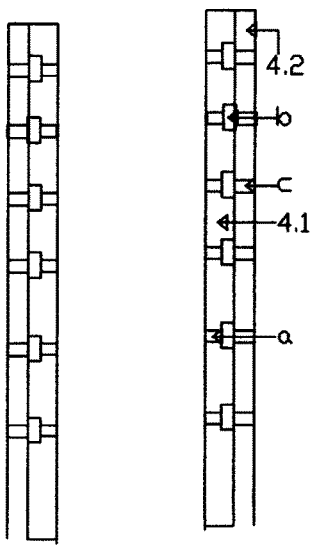
Fig. 2.1
Fig. 2.2
Fig. 2.3

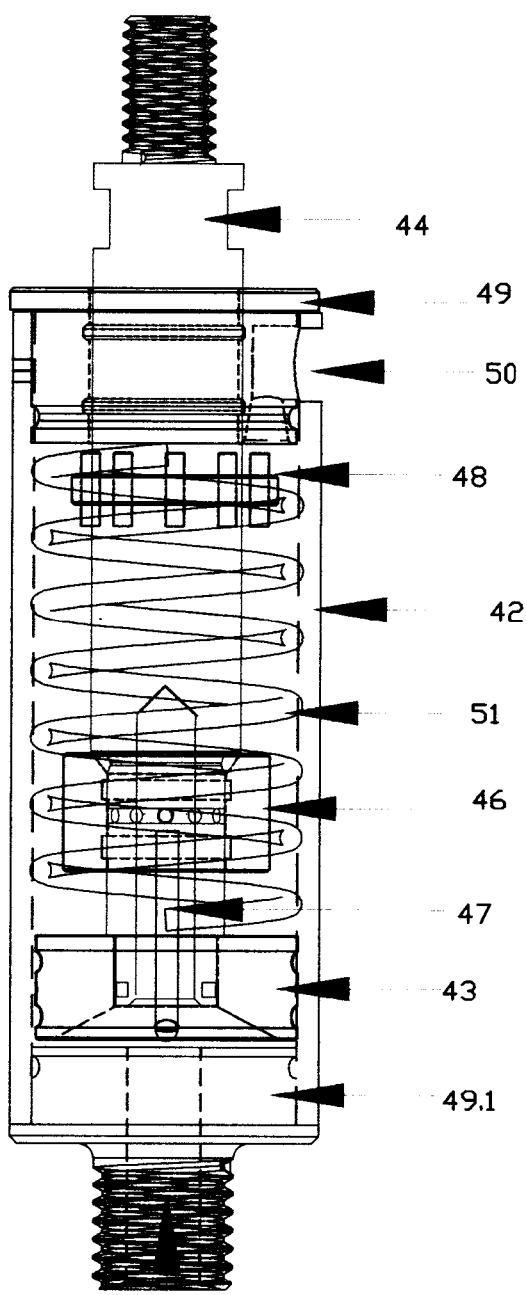
FIG. 3.1

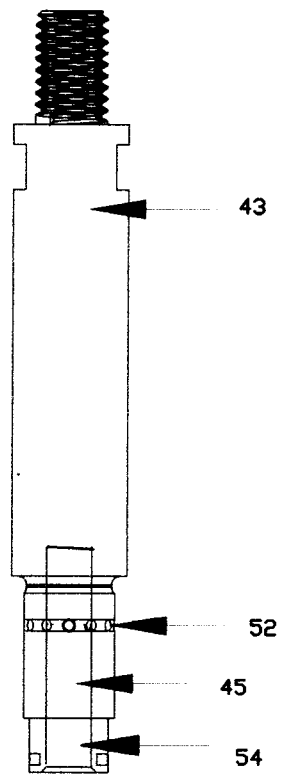
FIG. 3.2
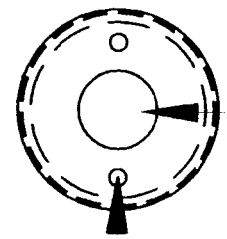
43.1  43.2
FIG. 3.3
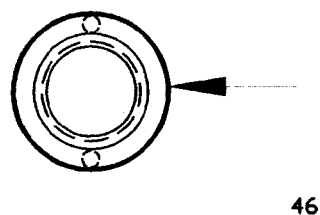
46
FIG. 3.4
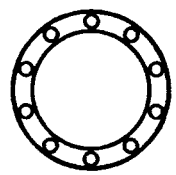
FIG. 3.5
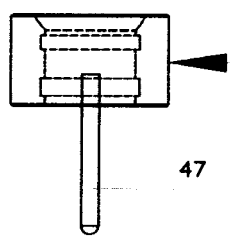

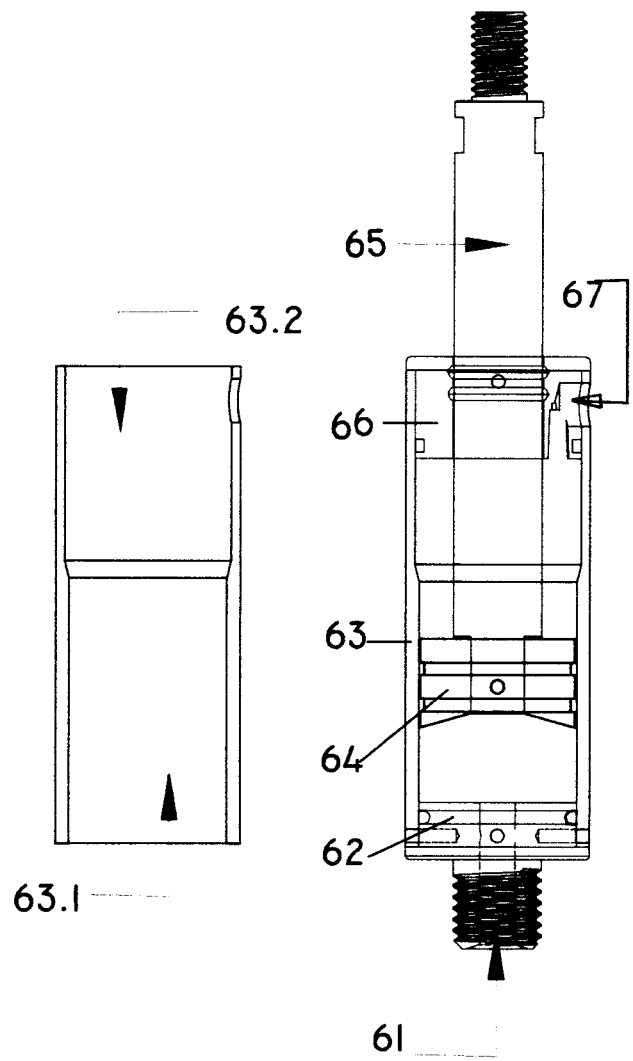
FIG. 4.2  FIG. 4.1

VEHICLE ACCIDENT DAMAGE CONTROL SYSTEM

AIM OF INVENTION

The aim of this invention is to provide a technology that reduces the increasing accident fear of passengers and drivers while using a vehicle. The disclosed invention can result in avoiding damage to the passengers as well as vehicle at the time of collision and try to avoid billions of deaths and injured/handicapped people every year besides loss of millions and billions rupees of wealth/assets.

Different types of technologies are available in market to reduce the damage of accidents. These technologies depend on maintaining adequate distance between vehicles but as density of vehicles keeps increasing, it is becoming difficult to maintain the distance as required by the technology. Therefore, sometimes these technologies fail to provide required results.

The disclosed technology is dependent on pressure rather than distance to provide the required protection and therefore traffic density on road does not affect its proper functioning. It works as a soft contact padding in between two vehicles or during collision of vehicles with obstruction. It provides an Auto Pressure Changer with Piston Displacement for Shock Absorber (APCPDSA) incorporated in combination with a safety grill/leg guard that functions to reduce the impact from the collision from fatal to safe. It also discloses a Frequently Breaking System (FBS) and Clutch Control System (CCS) which prevents further movement and controls the vehicles at the time of accidents. The impact energy is stored as compressed hydraulic fluid displaced to a reservoir. Because of an open ended flow of the pressurized hydraulic fluid there is no danger of damages even during any eventuality such as fire.

DETAILS OF INVENTION

The disclosed Vehicle Accident Damage Control System comprises a leg guard/safety plate/safety grill (1) which is configured on the inside the bumper of vehicle or any other outer part, fitted with a base plate/channel/frame (1.2) and that is attached through a nut-bolt and spring (1.1). It further incorporates at least one Auto Pressure Changer with Piston Displacement for Shock Absorber (APCPDSA) (also referred to as Auto Pressure Changer)(A)&(B) whose piston displacement works as shock absorber. The Auto Pressure Changers are firmly joined/fit to the frame of vehicle as shown in FIG. 1). At the time of fitting one has to be careful about the rolling wheel/sliding end which is configured with the piston rod (2) on the other end and joined with the walls of the safety plate (1). The base plate has to join strongly according to the FIG. 1). The nipples (7) & (7.1) of Auto Pressure Changers (A) & (B) are connected through connection (21) & (23) to a four or five mouth nipple (22). These nipples have non-return valves (40) & (29) as shown in the FIG. 1. The non-return valve (40) controls the flow direction of fluid to FBS (42) through connection (24). The fluid exit of FBS (42) is connected to CCS (63) through connection (25). CCS (63) is connected to a reservoir (28) through connection (26). A line hydraulic oil supplying oil to the APCPDSA is provided through NRV (29) from the reservoir tank from a below located outlet (27). FBS and CCS are fitted rigidly to the vehicle as needed. The piston rod of FBS and CCS is used to control the brake and clutch of the vehicle to control its motion. The reservoir tank is placed rigidly at a safe place above the level of hydraulic oil filled in APCPDSA, FBS, CCS etc. in the vehicle.

CONCLUSION OF INVENTION

When the vehicle collides with another vehicle or some obstruction, because of change in its velocity, an Impact force is generated between both vehicles or the vehicle and obstruction. Impact of the collision is taken by the leg guard/safety grill (invented) which in turn transfer the impact to the APCPDSA (invented). This Impact force is used to push the piston of APCPDSA. The result of collision reduces by the increased damping force, generated by hydraulic fluid flow out from internal cylinders (4.1) & (4.2) through (a-b-c) in APCPDSA. At the same time the pressurized hydraulic liquid flow, with the help of FBS (invented) pushes the brake of vehicle intermittently. The pressurized fluid thereafter moves to the CCS which causes the CCS (invented) piston to move to maximum displacement position and stops there. Thus with the help of CCS, the clutch gets actuated to disengage gear box from the engine. In the end the pressurized fluid moves to the reservoir where it gets stored. When the piston of the APCPDSA returns to its original position the fluid returns back to the APCPDSA. Thus the FBS and CCS function to stop the vehicle and avoid further damages to the vehicle itself, its occupants and surrounding property and people. As can be seen the invention reduces the damages not only by reducing the impact by absorbing part of it through APCPDSA but additionally prevents further damages due to vehicle loosing control as a result of the accident. In an aspect the FBS that is configured to provide frequent intermittent braking can prevent loss of control of the vehicle that may happen due to severe one time braking. Simultaneous declutching stops supply of power from the engine thus reducing the stopping distance.

BRIEF DESCRIPTION OF LINE DIAGRAM

FIG. 1—illustrates line diagram of the disclosed equipment.

FIG. 2.1—illustrates line diagram of Auto Pressure Changer with Piston Displacement for Shock Absorber (APCPDSA).

FIG. 2.2—illustrates line diagram of showing cross section of internal cylinders showing direction of liquid flowing in internal cylinders.

FIG. 2.3—illustrates line diagram of showing cross section of internal cylinders.

FIG. 3.1—illustrates line diagram of FBS

FIG. 3.2—Line diagram of piston rod of FBS.

FIG. 3.2—illustrates line diagram of piston rod of FBS

FIG. 3.3—illustrates line diagram of piston of FBS

FIG. 3.4—illustrates line diagram of valve cap of FBS

FIG. 3.5—illustrates line diagram of valve cap opener finger

FIG. 4.1—illustrates line diagram of CCS

FIG. 4.2—illustrates line diagram of cylinder of CCS.

DETAIL DESCRIPTION OF INVENTION

Details of published instruction in figures (A) and (B):—are "Auto Pressure Changer with Piston Displacement for Shock Absorber" (APCPDSA). Their number one or more as needed. And they are rigidly attached horizontally with the chassis frame or a rigid part of vehicle.

1—Leg guard/safety plate,
1.1—The nut bolt/rivet and spring that is attached with base plate to safety plate (1).
1.2—The base plate of safety plate.
1.3—The part that is cut/slot (radial or straight) to move the safety plate on base plate.
2—The piston rod of Auto Pressure Changer with Piston Displacement for Shock Absorber (APCPDSA).
2.1—Wheel attached to the piston rod.
2.11—Wheel attached to roller.
2.12—Pin attached to roller.
2.13—Roller frame
3—Piston
4—Pressure changing internal cylinders (4.1)& (4.2),
  a—holes in the wall of internal cylinder 4.1,
  b—circular groove made on the circumference of internal cylinder (4.1).
  c—The hole on the wall of outer cylinder (4.2).
5—Bottom valve
6—Casing cylinder of APCPDSA.
7—The outlets (7) & (7.1) of hydraulic liquid in (A) & (B) respectively.
8—Spring
9—Piston-rod side casing cap.
10—Bottom side casing cap.
11—Internal spring
12. Air release way on the casing.
13. Fluid bypass way when piston is back
Note:—2 to 20 are constituent parts of the Auto Pressure Changer with Piston Displacement for Shock Absorber (APCPDSA).
21—Connection between (A) and nipple (22).
22—A nipple with four or five mouths.
23—Connection between (B) & nipple (22).
24—Connection between the NRV (40) and inlet of FBS.
25—Connection between FBS fluid outlet (50) and CCS fluid inlet (61).
24.1—The lever valve which allows fluid to bypass FBS.
25.1—The lever valve which allows fluid to bypass CCS.
26—Connection between CCS fluid outlet (67) and reservoir.
27—Outlet of reservoir which sends hydraulic liquid to APCPDSA.
28—Reservoir tank
29—The non-return valve between reservoir and nipple (22) and which sends hydraulic fluid to the whole system.
40—Non-return valve which restricts hydraulic fluid to return from FBS.
41—FBS hydraulic fluid inlet.
42—FBS casing cylinder.
43—Piston
43.1—The holes for pins
43.2—The bore for piston rod.
44—Piston rod.
45—The central hole in piston rod.
46—Valve cap.
47—Valve cap in contact with pin and pin passing through the piston hole (43.1).
48—The opener finger of valve cap.
49—The piston rod side cap.
49.1—Piston rod opposite side cap.
50—Outlet for hydraulic liquid from FBS.
51—Spring
52—Plurality of radial holes connected with central hole of piston rod.
Note:—All parts from 40 to 60 are constituent parts of FBS which uses the forces produced in an accident to repeatedly apply brake. Its piston rod can be attached to brake lever/brake master cylinder/push-pull switch in brake oil line.
61—The inlet for hydraulic liquid in CCS.
62—CCS entrance cap.
63—CCS cylinder.
  63.1—Piston fit bore of CCS cylinder.
  63.2—Excess of piston bore of CCS cylinder, which easily bypasses hydraulic fluid.
64—Piston.
65—Piston rod.
66—Piston rod side cap of CCS.
67—Outlet of hydraulic liquid from CCS cylinder.
68—Spring (it returns the piston rod to initial position after effect of impact is over)
70—Rolling slider
71—Roller
Note:—Parts from 61 to 71, are constituent parts of CCS which is used to actuate clutch to disengage gear from engine on occurrence of an impact.

DETAIL DESCRIPTION OF WORK METHODOLOGY OF INVENTION

When a vehicle configured with the disclosed "Vehicle Accident Damage Control System" (VADCS) collides with any other vehicle or an obstruction, its safety plate/leg guard (1) is first to comes in contact with colliding object. The leg guard (1) is attached with base plate that have slot/hole (1.3) to permit its sliding and is fixed with vehicle chassis/frame. Further it is in contact with rolling wheel (2.1) that is mount on a piston rod (2) of APCPDSAs (A) & (B). Due to collision force APCPDSA gets actuated, and movement of its piston rod (2) inside the APCPDSAs (A) & (B), resulting in pressurized fluid flowing out through perforated walls (a-b-c) of internal cylinders (4.1) & (4.2), which increases the damping force against the piston motion in the (A) & (B) as the fluid has to move through restricted passage of holes and grooves, resulting in reduced collision force applied on piston (3).

Various rings of holes and groove-holes (a-b-c) are configured in parallel planes/layers as shown in FIG. 2.3 which direct flow of the hydraulic fluid through a restricted path to generate a damping force. Moving the piston inwards causes the piston to progressively cover these holes thus reducing the number of holes and therefore cross sectional area for flowing liquid; Due to which piston faces increasing damping-forces as it moves inwards. Magnitude of these damping forces increases as piston (3) crosses every ring/layer of (a-b-c);

The hydraulic liquid displaced by the piston rod (2) flows out from APCPDSA through outlets (7) & (7.1). One end of each connection (21) & (23) is connected with (7) & (7.1) and their other ends is connected with the four/five mouth nipple (22). The one end of connection (24) is attached to the non-return valve (40) and other is connected with FBS fluid inlet (41). The hydraulic liquid coming out of the walls of internal, cylinder (4.1) & (4.2) due to displacement by piston rod (2), flows through non-return valve (40) and reaches FBS where it applies hydraulic pressure on the piston (43) of FBS due to which the piston rod (44) is pushed forward. Valve cap (46) which slide on this piston rod is pushed toward the piston by opener finger (48), due to which all radial holes (52) situated below the valve cap (46) are opened which causes the free flow of hydraulic liquid. Now the pressure of hydraulic liquid is reduced due to centre hole (45) and the radial holes allowing the fluid to flow out. Upon which the piston (43) the wall of cap (49.1) valve (41), this closes radial holes (52) on the of piston rod (44) again. Due to which the pressure of hydraulic liquid begins to apply again on piston. Thus piston rod moves intermittently and this intermittent movement continues until the force produced due to the collision is finished. This periodic motion of the piston rod is used with braking system for intermittent application of brake during the force produced by accident. The piston rod of the FBS can be configured with brake actuating lever of the vehicle so that the intermittent movement of the piston rod of the FBS results in a frequent intermittent braking of the vehicle. Thus the FBS function to stop the vehicle and avoid further damages to the vehicle itself, its occupants and surrounding property and people. In an aspect the FBS that is configured to provide frequent intermittent braking can prevent loss of control of the vehicle that may happen due to severe one time braking.

In addition to intermittent braking, hydraulic liquid from the outlet (50) of the FBS reaches CCS (61) through connection (25) and applies force on piston (64) of the CCS, due to which piston moves (64) forward. The piston (64) pushes forward until the piston reaches a larger bore in casing (63) of CCS. Hydraulic liquid now flows through the gap between piston (64) and the part of larger bore of cylinder (63.2) keeping the piston in this position i.e. it moves one time to a fully extended position. The fluid thereafter flows out through exit of CCS (67) and thereafter through connection (26) to reach tank (28). The piston (64) can be configured with a clutch actuating lever of the vehicle so that the one time movement of the piston (64) cam actuate the clutch to disengage engine and gear box. Simultaneous declutching stops supply of power from the engine thus reducing the stopping distance thus providing further safety on occurrence of an accident.

The system comes back to its original position with the help of spring (8), which pushes piston rod (2) for which ample amount of hydraulic liquid is supplied from tank (28) through valve (29) to APCPDSA. The no. of APCPDSA depends upon the extent of safety required by the consumer. For making Vehicle more safe APCPDSA and leg guards can be attached to the back and side of chassis frame also depending on requirement.

The exemplary embodiments of the FBS and CCS have been explained with the respective pistons in extend-condition. It is possible to have FBS and CCS with respective pistons in reverse or in compressive condition.

Individual Description of Invented Parts—
(1)—Leg guard/Safety Plate—In this invention I have use the leg guard for taking the impact of collision. It transfers the impact generated force from the any point on the leg guard to the "Auto pressure changer with piston displacement for shock absorbers".
(2)—APCPDSA—In this Invention APCPDSA generates the increased damping force on piston when it moves inwards; with the help of hydraulic fluid flowing out through perforated walls (according to the FIG. 2.2 &2.3) of internal cylinders (4.1) & (4.2). The grooves provide a restricted passage for the fluid generating a damping force. APCPDSA tries to absorb the entire Impact Force. The no. of APCPDSA depends upon the requirement of vehicle.
(3)—FBS—In this Invention I generate piston oscillation when the fluid flows in one direction. FBS is used for applying brakes in vehicle with the help of pressurized hydraulic fluid generated by the APCPDSA using the Impact force
(4)—CCS—In this Invention I generate one time motion of CCS piston when pressurized fluid flows in one direction and stop it in that position for actuating the clutch when fluid continues to flow. When the fluid flow bypasses the CCS piston comes to the initial position with the help of spring.

I claim:

1. A vehicle accident damage control system configured to minimize damages to the vehicle and its occupants from collision, the control system comprising: at least one safety plate wherein the safety plate is integrated with the vehicle and slides relative to a rigid part of the vehicle during impact of collision; at least one auto pressure changer wherein the auto pressure changer is configured in between the safety plate and the rigid part of the vehicle to take the collision impact load from the safety plate; a pressurized hydraulic fluid wherein the pressurized hydraulic fluid is supplied by the auto pressure changer in the event of the at least one safety plate sliding relative to the rigid part during impact of the collision; a frequent braking system (FBS) wherein the frequent braking system is configured to receive the pressurized hydraulic fluid from the auto pressure changer and intermittently actuate brakes of the vehicle; and a clutch control system (CCS) wherein the clutch control system is configured to receive the pressurized fluid exiting from the frequent braking system and actuate a clutch of the vehicle to disengage gear box from engine of the vehicle.

2. The damage control system of claim 1, wherein the at least one auto pressure changer also acts to absorb the impact of the collision.

3. The damage control system of claim 1, wherein the intermittent actuation of the brakes is based on an intermittent movement of a piston rod of the FBS.

4. The damage control system of claim 1, wherein the CCS after receipt of the pressurized hydraulic fluid from the at least one auto pressure changer, actuates the clutch by movement of a piston rod of the CCS.

5. The damage control system of claim 1, wherein the damage control system further comprises a reservoir to store the hydraulic fluid and supply the hydraulic fluid to the at least one auto pressure changer.

6. The damage control system of claim 5, wherein the pressurized hydraulic fluid moves from the at least one auto pressure changer to the FBS and thereafter to the CCS and from there to the reservoir.

7. The damage control system of claim 6, wherein the damage control system incorporates non-return valves in the flow paths of the hydraulic fluid between the reservoir and the at least one auto pressure changer, and between the at least one auto pressure changer and the FBS.

8. An auto pressure changer configured to absorb impact of a collision, the auto pressure changer comprising: a piston configured on a piston rod; an internal cylinder configured for the piston to move in its bore and displace a hydraulic fluid from the internal cylinder; the internal cylinder further configured with a plurality of holes and circular grooves on its outer circumference; and wherein the movement of the piston in the bore of the internal cylinder progressively blocks the holes; an outer cylinder configured around the internal cylinder and configured with a plurality of holes; a casing to house the internal cylinder and the outer cylinder; wherein the holes on the internal cylinder, the circular grooves on the outer circumference of the internal cylinder and the holes on the outer cylinder are configured to allow passage of fluid displaced from the internal cylinder to the casing and in the process enable the auto pressure changer to absorb the impact of the collision; and wherein the progressive blocking of the holes configured on the internal cylinder results in progressive increase in the absorption of the impact of the collision.

9. A frequent braking system (FBS) configured to apply brakes through movement of a piston rod, the FBS comprising: a piston rigidly fixed with the piston rod and the piston along with piston rod slidably configured within a cylinder; the piston dividing the cylinder in an upper chamber and a lower chamber, wherein the lower chamber is configured to receive a pressurized hydraulic fluid and the upper chamber is configured to allow free flow of the hydraulic fluid; further the piston rod configured with a central passage and a plurality of radial holes, wherein the central passage and the plurality of radial holes are configured to allow transfer of the hydraulic fluid from the lower chamber to the upper chamber when the plurality of radial holes are not blocked but block the transfer when the plurality of radial holes are blocked; a valve cap configured to slide on the piston rod between a position nearer to the piston and another position farther from the piston, wherein the plurality of radial holes are blocked when the valve cap is in the farther position and the plurality of radial holes are not blocked when the valve cap is in the nearer position; an opener finger configured in the upper chamber, wherein the opener finger is configured to make contact with the valve cap and move the valve cap from the farther position to the nearer position as the piston and the piston rod move upwards within the cylinder; at least one pin configured through the piston, wherein the at least one pin is configured to make contact with the valve cap and move the valve cap from the nearer position to the farther position as the piston and the piston rod move downwards within the cylinder; and a spring configured between atop of the cylinder and the piston and biased to move the piston and the piston rod downwards; wherein movement of the valve cap from the farther position to the nearer position and vice-versa causes intermittent upward and downward movement of the piston rod under pressure of the pressurized hydraulic fluid and the spring due to opening of the plurality of radial holes when the valve cap is in the nearer position thereby allowing the hydraulic fluid to flow from the lower chamber to the upper chamber relieving the pressure on piston to make the spring move the piston downward direction; and due to blocking of plurality of radial holes when the valve cap is in the farther position thereby preventing the hydraulic fluid to flow from the lower chamber to the upper chamber and resultant build up of pressure in the lower chamber to move the piston in the upward direction.

* * * * *